United States Patent
Mizuhira et al.

(10) Patent No.: US 9,511,724 B2
(45) Date of Patent: Dec. 6, 2016

(54) WIRE HARNESS (75) Inventors: Takeshi Mizuhira, Mie (JP); Yukihiro Shirafuji, Mie (JP); Isamu Hamamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/125,682

(22) PCT Filed: Apr. 4, 2012

(86) PCT No.: PCT/JP2012/059144
§ 371 (c)(1),
(2), (4) Date: Dec. 12, 2013

(87) PCT Pub. No.: WO2013/042393
PCT Pub. Date: Mar. 28, 2013

(65) Prior Publication Data
US 2014/0124261 A1    May 8, 2014

(30) Foreign Application Priority Data
Sep. 22, 2011 (JP) ................. 2011-207349

(51) Int. Cl.
   *H01B 13/012*    (2006.01)
   *B60R 16/02*    (2006.01)
   *H02G 3/04*    (2006.01)
   *H02G 3/30*    (2006.01)
   *H02G 3/34*    (2006.01)

(52) U.S. Cl.
CPC ......... *B60R 16/0215* (2013.01); *H02G 3/0462* (2013.01); *H02G 3/30* (2013.01); *H02G 3/34* (2013.01)

(58) Field of Classification Search
CPC ... B60R 16/0215; H02G 3/30; H02G 3/0462
USPC ................................................. 174/72
See application file for complete search history.

(56) References Cited

U.S. PATENT DOCUMENTS

| | | | |
|---|---|---|---|
| 6,206,331 B1 * | 3/2001 | Keith et al. ............ | 248/74.1 |
| 7,533,853 B2 * | 5/2009 | Ogawa .................. | 248/74.1 |
| 7,754,301 B2 * | 7/2010 | Yamaguchi .......... | B60R 16/0215 428/34.9 |
| 2009/0218464 A1 * | 9/2009 | Kato ..................... | B60R 13/0206 248/316.7 |
| 2014/0102747 A1 | 4/2014 | Mizuhira et al. | |

FOREIGN PATENT DOCUMENTS

| | | | |
|---|---|---|---|
| JP | 10-172364 | * | 6/1998 |
| JP | 2003-197038 | | 7/2003 |
| JP | 2005-304239 | | 10/2005 |
| JP | 2008-226587 | | 9/2008 |

OTHER PUBLICATIONS

International Search Report, mail date is May 22, 2012.

* cited by examiner

*Primary Examiner* — Tuan T Dinh
*Assistant Examiner* — Rockshana Chowdhury
(74) *Attorney, Agent, or Firm* — Greenblum & Bernstein, P.L.C.

(57) ABSTRACT

A purpose is, in the case where a nonwoven member is hot pressed around a wire harness to form a protective member, to inhibit rotation of a vehicle body fixing component attached to the protective member while making a cross-sectional shape of the protective member as circular as possible. The wire harness includes a wire harness body containing at least one electric wire and a protective member formed by hot pressing a nonwoven member in a state of covering at least a portion of the wire harness body. The protective member has a protective member that is formed to have a circular cross-sectional shape and a flat surface forming part that has a flat surface formed on at least a portion of an outer periphery.

5 Claims, 5 Drawing Sheets

WIRE HARNESS

FIELD OF THE INVENTION

The present invention relates to a technology that protects a wire harness.

BACKGROUND OF THE INVENTION

Patent Literature 1 discloses a technology for forming a protector around a flat circuit body. The protector is formed by sandwiching the flat circuit body using two covering bodies made of a nonwoven fabric thermoplastic material containing a thermoplastic felt or a foaming agent and press-molding while heating the resulting combination to firmly attach the two covering bodies to the flat circuit body and weld portions of the two covering bodies where they are in contact with each other.

RELATED ART

Patent Literature

[Patent Literature 1] Japanese Patent Laid-Open Publication No. 2003-197038.

SUMMARY OF THE INVENTION

Problems to be Solved by the Invention

However, usually, since a wire harness arranged in a vehicle body is formed by bundling a plurality of electric wires, the wire harness has a cross section that exhibits a circular shape. Therefore, when forming a protector to cover such a wire harness, it is preferable that the protector is formed to have a circular cross-sectional shape.

Further, when protecting a wire harness using the above protector, the protector is formed to have a shape that is bent along a wiring path of the wire harness. When assuming a case where the protector is press-molded in such a bent shape, it is preferable that the protector is formed to have a circular cross-sectional shape in order to simplify the mold configuration.

Here, as a vehicle body fixing component, there is one having a flat plate-shaped attachment plate often referred to as a sleeve-shaped clamp, for example. Such a vehicle body fixing component is attached to a wire harness by winding an adhesive tape around the wire harness and the attachment plate in a state in which the attachment plate is arranged along outer periphery of the wire harness. However, a vehicle body fixing component having an attachment plate as described above is attached to a protector having a circular cross-sectional shape, the vehicle body fixing component rotates around the protector. Therefore, in the state in which the wire harness is arranged along a predetermined wiring path, the vehicle body fixing component is not arranged in an attachment target position in the vehicle body so that an attachment operation of the vehicle body fixing component becomes difficult. Even in a state in which the vehicle body fixing component is attached to the vehicle body, there is a risk that the wire harness may rotate relative to the vehicle body fixing component and interfere with a peripheral component.

Therefore, a purpose of the present invention is, in the case where a nonwoven member is hot pressed around a wire harness to form a protective member, to inhibit rotation of a vehicle body fixing component attached to the protective member while making a cross-sectional shape of the protective member as circular as possible.

Means for Solving the Problems

In order to achieve the above purpose, a wire harness according to a first aspect includes a wire harness body that contains at least one electric wire; and a protective member that is formed by hot pressing a nonwoven member in a state of covering at least a portion of the wire harness body and has a protective body and a flat surface forming part, the protective body being formed to have a circular cross-sectional shape, the flat surface forming part having a flat surface formed on at least a portion of an outer periphery of the flat surface forming part.

As a second aspect, in the wire harness according the first aspect, a vehicle body fixing component having a long and thin plate-like attachment plate and a vehicle body fixing part capable of being fixed on a vehicle body is attached in a state in which the attachment plate is brought into surface-contact with the flat surface.

As a third aspect, in the wire harness according the second aspect, a length dimension of the flat surface in a longitudinal direction of the protective member is configured to be a dimension corresponding to a length of the attachment plate.

As a fourth aspect, in the wire harness according the second aspect or the third aspect, a width dimension of the flat surface is configured to be a dimension corresponding to width of the attachment plate.

As a fifth aspect, in the wire harness according any one of the first-fourth aspects, the flat surface is formed in a shape that indicates an attachment orientation of the vehicle body fixing component that is attached to the flat surface forming part.

Effect of the Invention

According to the wire harness of the first aspect, the protective body can be formed to have a circular cross-sectional shape. When the vehicle body fixing component is attached to the flat surface forming part, rotation of the vehicle body fixing component is inhibited by the flat surface.

According to the second aspect, the vehicle body fixing component is fixedly attached to the wire harness in the state in which the attachment plate is brought into surface-contact with the flat surface. Therefore, rotation of the vehicle body fixing component can be inhibited.

According to the third aspect, by bringing the entire attachment plate in a longitudinal direction into contact with the flat surface, the protective body having a circular cross-sectional shape can be formed on a portion as large as possible while inhibiting rotation of the vehicle body fixing component.

According to the fourth aspect, by bringing the entire attachment plate in a width direction into contact with the flat surface, a portion of the flat surface forming part where the flat surface is formed can be made as small as possible while inhibiting rotation of the vehicle body fixing component.

According to the fifth aspect, attachment orientation of the vehicle body fixing component can be recognized based on a shape of a flat surface.

MODE FOR CARRYING OUT THE INVENTION

Figure 1:
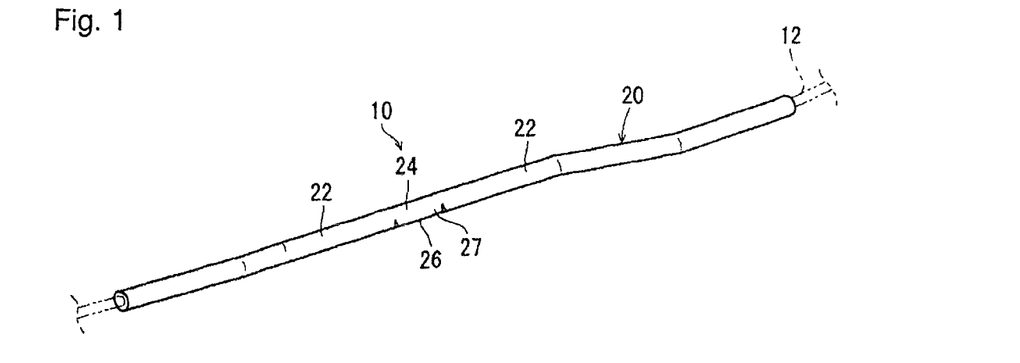
FIG. 1 illustrates a schematic perspective view of a wire harness.
Figure 2:
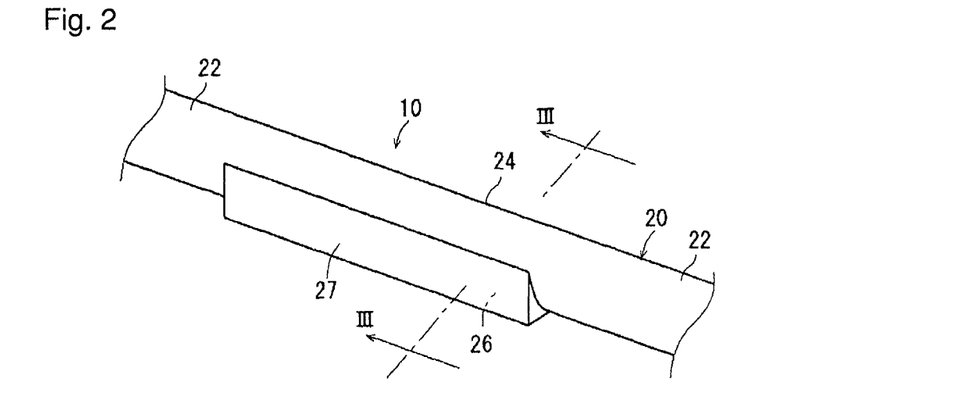
FIG. 2 illustrates a partial perspective view of the wire harness.
Figure 3:
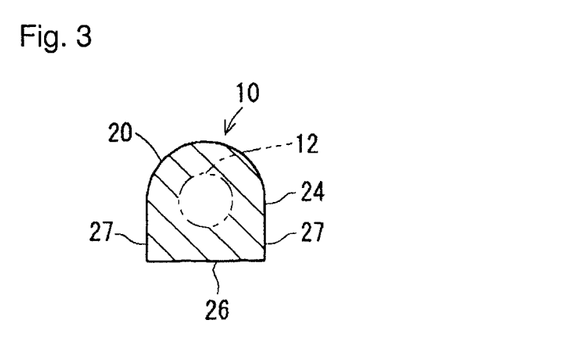
FIG. 3 illustrates a cross-sectional view along a line III-III of FIG. 2.

In the following, a wire harness according to an embodiment is described. FIG. 1 illustrates a schematic perspective view of a wire harness 10. FIG. 2 illustrates a partial perspective view of the wire harness 10. FIG. 3 illustrates a cross-sectional view along a line III-III of FIG. 2.

The wire harness 10 includes a wire harness body 12 and a protective member 20.

The wire harness body 12 contains at least one electric wire. Here, the wire harness body 12 is configured by bundling a plurality of electric wires along a wiring path of a vehicle to which the wire harness body 12 is to be installed. The plurality of the electric wires are usually bundled in such a manner that a cross-sectional shape of the wire harness body 12 in a plane perpendicular to a longitudinal direction of the wire harness body 12 exhibits a circular shape. The electric wires are wiring materials that electrically interconnect various electronic devices in a vehicle body and the like. An optical cable and the like may also be included in the wire harness body 12.

The protective member 20 is formed by hot pressing a nonwoven member (such as a nonwoven fabric) in a state of covering at least a portion of the wire harness body 12 in the longitudinal direction. The protective member 20 may cover substantially the entire wire harness body 12 in the longitudinal direction and may also cover a portion of the wire harness body 12.

As the nonwoven member, a material that can be hardened by being subjected to heating process can be used. As such a nonwoven member, a material containing elementary fibers and an adhesive resin (also referred to as a binder) intertwined with the elementary fibers can be used. The adhesive resin is a resin having a melting point (for example, 110° C.-115° C.) lower than that of the elementary fibers. When the nonwoven member is heated at a processing temperature lower than the melting point of the elementary fibers and higher than the melting point of the adhesive resin, the adhesive resin melts and soaks into the elementary fibers. Thereafter, when the nonwoven member is cooled to a temperature below the melting point of the adhesive resin, the adhesive resin is solidified in a state in which the elementary fibers are bound with one another. As a result, the nonwoven member becomes harder than the state before heating and is maintained at a shape molded during heating. Further, at portions of the nonwoven member that are in contact with each other, the melt adhesive resin also soaks into the contact portions and solidifies. As a result, the contact portions of the nonwoven member are bonded.

However, the elementary fiber can be any fiber that can maintain a fiber state at the melting point of the adhesive resin. Thus, in addition to resin fiber, various fibers can be used as the elementary fiber. Further, as the adhesive resin, thermoplastic resin fiber having a melting point lower than the melting point of the elementary fiber can be used. The adhesive resin may be granular or fibrous. Further, it is also possible to configure a binder fiber by forming an adhesive resin layer on outer periphery of a core fiber and use the binder fiber to intertwine with the elementary fiber. As the core fiber of this case, a fiber of the same material as the above elementary fiber can be used.

An example of the combination of the elementary fiber and the adhesive resin is using resin fiber of PET (polyethylene terephthalate) as the elementary fiber and copolymer resin of PET and PEI (polyethylene isophthalate) as the adhesive resin. In this case, the melting point of the elementary fiber is about 250° C. and the melting point of the adhesive resin is 110° C.-150° C. Therefore, when the nonwoven member is heated to a temperature of 110° C.-250° C., the adhesive resin melts and soaks into the elementary fiber that does not melt and maintains a fiber state. When the nonwoven member is cooled to a temperature below the melting point of the adhesive resin, the adhesive resin solidifies in a state in which the elementary fibers are bound with one another, and the above-described maintenance of the molded shape and the bonding of the nonwoven members are performed.

Further, the "hot press" refers to subjecting the nonwoven member to heat treatment and performing a process in which the nonwoven member is formed in a predetermined shape by being pressed against a mold. The heat treatment and the process of forming the nonwoven member in the predetermined shape may be simultaneously performed or may also be continuously and separately performed. An example of the hot press process suitable for manufacturing the protective member 20 according to this embodiment will be further described in detail below.

The protective member 20 has a protective body 22 and a flat surface forming part 24. The protective member 20 is formed to have an external shape corresponding to a shape of a mold when the nonwoven member is hot pressed. Therefore, by hot pressing the nonwoven member using a mold that has a mold surface corresponding desired external shapes of the protective body 22 and the flat surface forming part 24, the protective body 22 and the flat surface forming part 24 can be separately created.

The protective body 22 is a portion that constitutes most of the protective member 20 in the longitudinal direction. Here, the protective member 20 excluding the portion where the flat surface forming part 24 is formed is the protective body 22. A cross-sectional shape of the protective body 22 in a plane perpendicular to the longitudinal direction thereof is formed in a circular shape. Therefore, even when the protective member 20 most of which is constituted by the protective body 22 is formed in a bent shape corresponding to a wiring path of the wire harness body 12 (in particular, when the protective member 20 is formed in a three-dimensionally bent shape), an undercut place is less likely to occur. Therefore, the protective member 20 can be easily molded into a shape. Further, the wire harness body 12 is usually configured by bundling a plurality of electric wires in a manner exhibiting a circular cross-sectional shape. Therefore, when the sheet-like nonwoven member is wrapped around the wire harness body 12, an external shape of the resulting combination also has a circular cross-sectional shape. Therefore, by performing hot pressing in a manner that an external shape of the protective body 22 also exhibits a circular cross-sectional shape, the outer periphery of the protective body 22 can be processed to have a uniform state by making a compression degree and the like as uniform as possible.

The flat surface forming part 24 is partially provided in the longitudinal direction of the protective member 20. A position where the flat surface forming part 24 is formed is a position in the wire harness where a vehicle body fixing component 50 (to be described later) is to be attached. The flat surface forming part 24 may be formed to have a length dimension, in the longitudinal direction of the protective member 20, that is required for attaching the vehicle body fixing component 50 (to be described later), or to have a length dimension longer (somewhat longer) than the length dimension required for attaching the vehicle body fixing component 50.

A flat surface 26 is partially formed on outer periphery of the flat surface forming part 24. Here, a portion of the outer periphery of the flat surface forming part 24 partially projects outward and the flat surface 26 is formed on the projecting portion. More specifically, two portions that are each formed in a triangular prism shape having a right triangular cross section are configured to be continuously provided on the outer periphery of the flat surface forming part 24 in an orientation in which right-angled sides of the triangular prisms face outward and a longitudinal direction of the triangular prisms is along a longitudinal direction of the flat surface forming part 24. Between the portions, the flat surface 26 is formed that extends in a tangential direction on the outer periphery of the flat surface forming part 24. Further, on two sides of the flat surface, side surfaces 27 that extend toward the outer periphery of the flat surface forming part 24 are formed in an orientation perpendicular to the flat surface 26. By a portion surrounded by the flat surface 26 and the two side surfaces 27, a portion is formed exhibiting a rectangular shape in a part of the cross-sectional shape of the flat surface forming part 24. The shape of the flat surface forming part 24 excluding the projecting portions for forming the flat surface 26 as described above is formed in a semi-cylindrical surface shape that is continuous to the external shape of the protective body 22.

Figure 4:
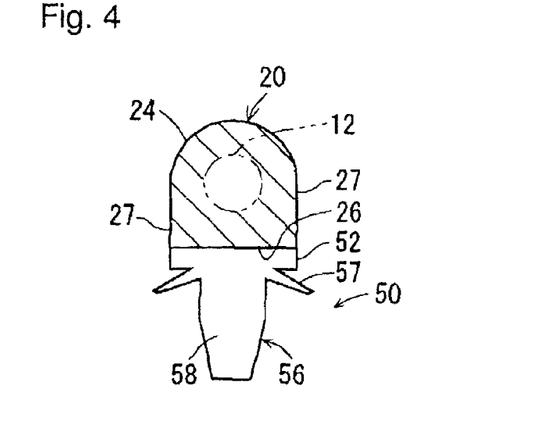
FIG. 4 illustrates a cross-sectional view of a state in which a vehicle body fixing component is attached to a flat surface forming part.
Figure 5:
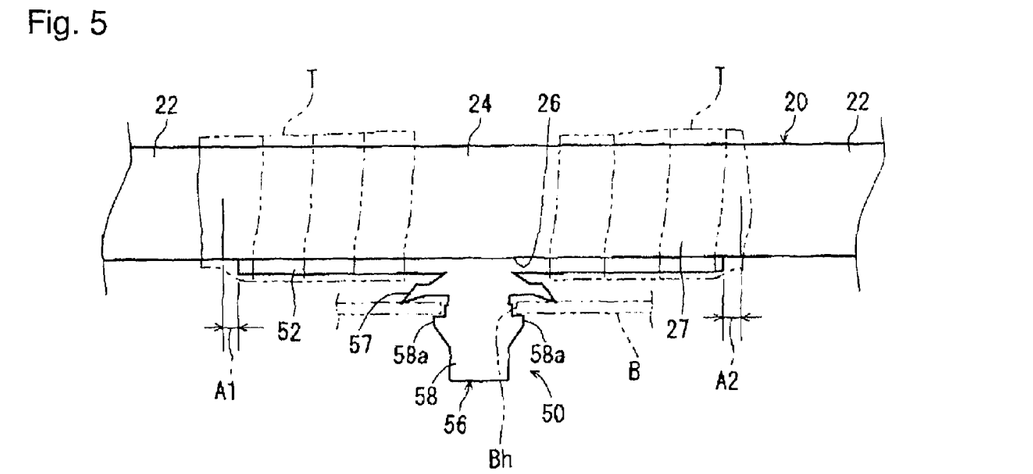
FIG. 5 illustrates a schematic side view of a state in which a vehicle body fixing component is attached to a flat surface forming part.

FIG. 4 illustrates a schematic cross-sectional view of a state in which the vehicle body fixing component 50 is attached to the flat surface forming part 24. FIG. 5 illustrates a schematic side view of the state in which the vehicle body fixing component 50 is attached to the flat surface forming part 24.

The vehicle body fixing component 50 has a long and thin plate-like attachment plate 52 and a vehicle body fixing part 56, is a component integrally molded with resin, and is a component that is also referred to as a sleeve-shaped clamp. A vehicle body fixing component in which the attachment plate extends toward both sides relative to the vehicle body fixing part is referred to as a two-sleeve clamp and a vehicle body fixing component in which the attachment plate extends toward only one side relative to the vehicle body fixing part is referred to as a single-sleeve clamp. Here, an example is described in which the vehicle body fixing component 50 is a two-sleeve clamp. However, the vehicle body fixing component 50 may also be a single-sleeve clamp.

The attachment plate 52 is formed in a long and thin plate-like shape. The attachment plate 52 is set to have a width such that the attachment plate 52 does not significantly protrude on both sides of the protective member 20. Here, the attachment plate 52 is configured to have a width that is substantially the same as a diameter of the protective member 20. Further, the attachment plate 52 is configured to have a length dimension such that an adhesive tape can be wrapped around a portion that protrudes from the vehicle body fixing part 56.

Further, the vehicle body fixing part 56 is integrally formed in a manner projecting from a middle portion in a longitudinal direction of one principal surface (lower surface in FIGS. 4 and 5) of the attachment plate 52, and has a dish-shaped part 57 and an engaging lock part 58. Therefore, the attachment plate 52 extends on both sides of the vehicle body fixing part 56. The dish-shaped part 57 is formed in a dish shape that gradually spreads toward an engaging lock part 58 side. Further, the engaging lock part 58 is protrusively formed on a central part on an inner side of the dish-shaped part 57. The retaining projection $58a$ is formed at a position a predetermined distance away from the dish-shaped part 57. The retaining projection $58a$ is a member elastically deformable in an inward-outward direction and is simplistically illustrated in FIGS. 4 and 5.

The present vehicle body fixing component 50 is fixedly attached to the flat surface forming part 24 as follows. That is, the other principal surface (upper surface in FIGS. 4 and 5) of the attachment plate 52 is arranged along a longitudinal direction of the flat surface 26 and is brought into surface-contact with the flat surface 26. In this state, an adhesive tape T is spirally wrapped around both side portions of the attachment plate 52 and the protective member 20. As a result, the vehicle body fixing component 50 is fixedly attached to the flat surface forming part 24. In this state, the principal surface of the attachment plate 52 is in a state of being pressed against the flat surface 26 in a surface-contact state. Therefore, rotation of the vehicle body fixing component 50 around the flat surface forming part 24 is inhibited.

In this case, from a point of view of inhibiting rotation, it is preferable that a contact area between the principal surface of the attachment plate 52 and the flat surface 26 is as large as possible. On the other hand, in order to easily mold the protective member 20 and in order to generate a uniform processing state on the outer periphery of the wire harness body 12 by making a compression degree of the protective member 20 and the like as uniform as possible, it is preferable that the protective member 20 are formed to have a circular cross-sectional shape in as many portions as possible.

Therefore, it is preferable that a length dimension of the flat surface 26 in the longitudinal direction of the protective member 20 is configured to be a dimension corresponding to the length of attachment plate 52, specifically, a length dimension that is the same as the length of the attachment plate 52 or a length dimension obtained by adding attachment position errors A1, A2 to the length dimension of the attachment plate 52. The attachment position errors A1, A2 are values that are set on an empirical or experimental basis according to a path length, flexibility and the like of the wire harness 10. As a result, by making the contact area between the principal surface of the attachment plate 52 and the flat surface 26 as large as possible while making a percentage occupied by the protective body 22 as large as possible, rotation of the vehicle body fixing component 50 can be inhibited.

Further, it is preferable that a width dimension of the flat surface 26 is configured to be a dimension corresponding to a width of the attachment plate 52, specifically, a dimension that is the same as that of the attachment plate 52. As a result, by making the contact area between the principal surface of the attachment plate 52 and the flat surface 26 as large as possible while making the flat surface 26 as small as possible to allow the percentage occupied by a curved surface on the outer periphery of the flat surface forming part 24 to be made as large as possible, rotation of the vehicle body fixing component 50 can be inhibited.

As described above, in the state in which the attachment plate 52 of the vehicle body fixing component 50 is fixedly attached to the flat surface forming part 24, when the engaging lock part 58 is pushed into an attaching hole Bh formed on a vehicle body B to bring the dish-shaped part 57 into contact with the vehicle body B and to retain and engage the retaining projection 58a with the attaching hole Bh, the vehicle body fixing part 56 is fixedly attached to the vehicle body B. In this way, the wire harness 10 is attached to the vehicle body B via the vehicle body fixing component 50.

Next, a method manufacturing the above protective member 20 using a hot press is described.

Figure 6:
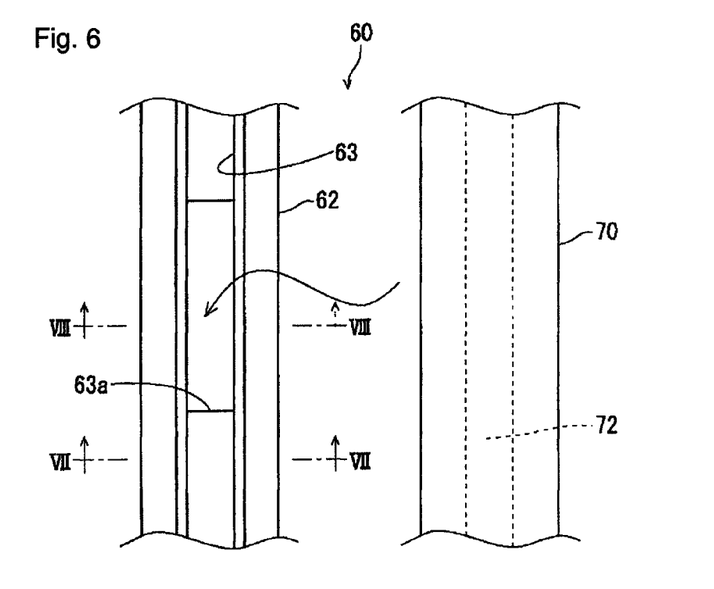
FIG. 6 illustrates an explanatory diagram of a hot-press mold.
Figure 7:
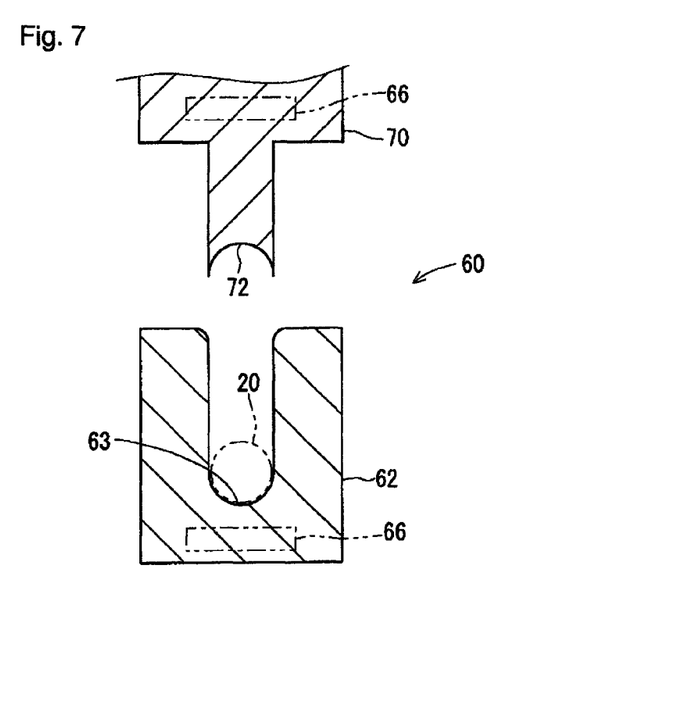
FIG. 7 illustrates a schematic cross-sectional view along a line VII-VII of FIG. 6.
Figure 8:
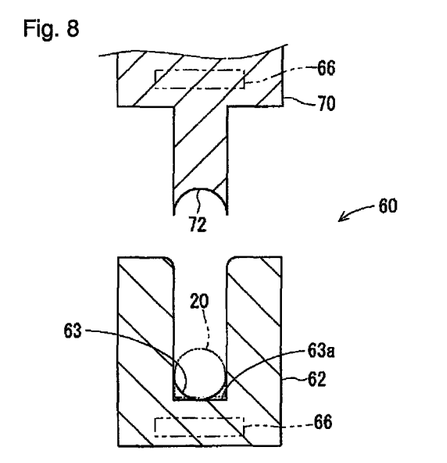
FIG. 8 illustrates a schematic cross-sectional view along a line VIII-VIII of FIG. 6.

First, an example of a configuration of a hot-press mold used in manufacturing the protective member 20 is described. FIG. 6 illustrates an explanatory diagram of a hot-press mold 60. FIG. 7 illustrates a schematic cross-sectional view along a line VII-VII of FIG. 6. FIG. 8 illustrates a schematic cross-sectional view along a line VIII-VIII of FIG. 6.

The hot-press mold 60 is provided with a lower mold 62 and an upper mold 70.

The lower mold 62 is a long member formed of a metal and the like having excellent thermal conductivity. A lower mold surface 63 is formed on one principal surface (upper surface) of the lower mold 62. Schematically, the lower mold surface 63 is formed in a groove shape that opens upward and on both end sides. The lower mold surface 63 is formed to have a length in a longitudinal direction that is substantially the same as a length of a to-be-protected portion of the wire harness body 12 (portion to be covered by the protective member 20). Further, the lower mold surface 63 is formed in a shape that extends while bending in accordance with a path in a case where the to-be-protected portion of the wire harness body 12 is arranged in a vehicle body (only a portion is illustrated in FIG. 5).

Further, a bottom part of a portion of the lower mold surface 63 that corresponds to the protective body 22 is formed to have a semi-circular cross-sectional shape. In other words, the portion of the lower mold surface 63 that corresponds to the protective body 22 is formed to have a shape in which a semi-circular groove is continuously formed below a portion that opens with a uniform width. Further, a bottom part of a portion of the lower mold surface 63 that corresponds to the flat surface forming part 24 is formed to have a rectangular cross-sectional shape. In other words, the portion of the lower mold surface 63 that corresponds to the flat surface forming part 24 is formed as a recess 63a having a rectangular cuboid shape.

The upper mold 70 is a long member formed of a metal and the like having excellent thermal conductivity. On one principal surface (lower surface) of the upper mold 70, an upper mold surface 72 is formed in a groove shape having an arc-shaped cross section. The upper mold surface 72 is formed to have a width that allows the upper mold surface 72 to be arranged inside the lower mold surface 63 while allowing the upper opening of the above lower mold surface 63 to be closed. Further, the upper mold surface 72 is formed in a shape that extends while bending in accordance with a bending shape of the above lower mold surface 63.

By arranging the upper mold surface 72 inside the lower mold surface 63, a space that allows the protective member 20 to be formed is formed between the upper mold surface 72 and the lower mold surface 63. A heating mechanism 66 such a heater is provided in each of the lower mold 62 and the upper mold 70.

Next, a method manufacturing the protective member 20 using the above hot-press mold 60 is described.

First, a to-be-protected portion of the wire harness body 12 containing at least one electric wire is covered by a nonwoven member. As an embodiment of covering around the wire harness body 12 with a nonwoven member, for example, a configuration can be adopted in which a sheet-like nonwoven member (nonwoven fabric) is formed in a rectangular shape and the rectangular nonwoven member is wrapped at least once around the wire harness body 12, or a configuration can be adopted in which a sheet-like nonwoven member (nonwoven fabric) is formed in a band-like shape and the band-like nonwoven member is spirally wrapped around the wire harness body 12.

Next, the nonwoven member covering the wire harness body 12 is arranged inside the lower mold surface 63 of the lower mold 62.

Thereafter, the upper mold surface 72 of the upper mold 70 is inserted into the lower mold surface 63. In this state, the nonwoven member is hot pressed inside the hot-press mold 60. That is, in a state in which the nonwoven member is pressed between the lower mold surface 63 and the upper mold surface 72, the nonwoven member is heated. Thereafter, when the nonwoven member is cooled, a surface of the nonwoven member is cured in a shape corresponding to the shapes of the lower mold surface 63 and the upper mold surface 72. That is, the protective member 20 is cured in a shape in a longitudinal direction corresponding to the bending shapes of the lower mold surface 63 and the upper mold surface 72. Further, the surface of the protective member 20 is cured in a shape in which the protective body 22 is formed and in a shape in which the flat surface forming part 24 is formed, and is maintained in a predetermined shape. Further, contact portions of the nonwoven member are bonded and a state in which the wire harness body 12 is covered is maintained.

According to the wire harness 10 configured as described above, the protective body 22 can be formed to have a circular cross-sectional shape. As a result, even in the case where the wire harness body 12 is formed in a bent shape according to a wiring path, when the protective member 20 is molded using the hot-press mold 60 and the like, an undercut portion is less likely to occur and thus the protective member 20 can be easily molded. Further, the outer periphery of the protective body 22 can be made in a uniform state by making a compression degree and the like as uniform as possible.

Further, when the vehicle body fixing component 50 is attached to the flat surface forming part 24, the principal surface of the attachment plate 52 is pressed against the flat surface 26 in a surface-contact state. Therefore, rotation of the vehicle body fixing component 50 is inhibited. As a result, in a state in which the wire harness 10 is arranged along a predetermined wiring path in a vehicle body, the vehicle body fixing part 56 of the vehicle body fixing component 50 can be more accurately arranged in the attaching hole Bh that is an attachment target position, and the operation of attaching the vehicle body fixing component 50 to the vehicle body B can be easily performed. Further, in the state in which the vehicle body fixing component 50 is attached to the vehicle body B, the wire harness body 12 becomes difficult to rotate relative to the vehicle body fixing component 50, and the wire harness body 12 can be more surely maintained in a constant orientation. Therefore, the wire harness body 12 is less likely to interfere with a peripheral component.

Figure 9:
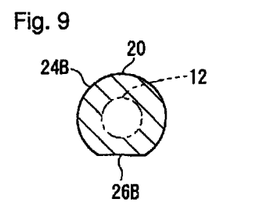
FIG. 9 illustrates a schematic cross-sectional view of a flat surface forming part according to a modified embodiment.
Figure 10:
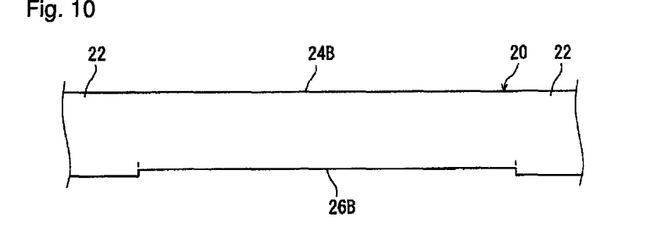
FIG. 10 illustrates a schematic side view of the flat surface forming part according to the modified embodiment.

In the present embodiment, formation of the flat surface 26 is not limited to the above example. For example, as in a modified embodiment illustrated in FIGS. 9 and 10, it is also possible that a flat surface 26B that corresponds to the flat surface 26 is formed by planarly recessing a portion of outer periphery of a flat surface forming part 24B that corresponds to the above flat surface forming part 24. Further, a plurality of the above flat surfaces 26, 26B may be formed on the outer periphery of the flat surface forming part 24.

Further, the above flat surface 26, 26B can also be used as a mark indicating a position where the vehicle body fixing component 50 is attached. Therefore, there is also a merit that, for example, on an assembly drawing board of the wire harness 10, an attachment supporting tool of the vehicle body fixing component 50 can be omitted. That is, when attaching the vehicle body fixing component 50 to the wire harness 10 on an assembly drawing board, in order for an attachment position of the vehicle body fixing component 50 with respect to the wire harness 10 to be maintained constant, an attachment supporting tool may be erected supporting the vehicle body fixing component 50 on the assembly drawing board. When the attachment supporting tool is used, by attaching the vehicle body fixing component 50 that is supported by the attachment supporting tool to the wire harness 10 arranged in a manner passing through the attachment supporting tool, the vehicle body fixing component 50 can be attached to the wire harness 10 at an accurate position.

Figure 11:
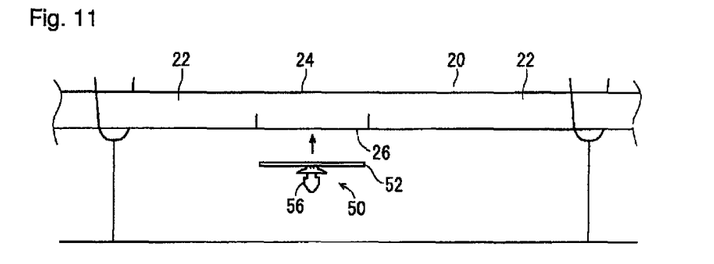
FIG. 11 illustrates an explanatory diagram of an operation attaching a vehicle body fixing component to a protective member.

On the other hand, according to the present embodiment, even without the attachment supporting tool, as illustrated in FIG. 11, when an operator attaches the vehicle body fixing component 50 to the protective member 20 in the assembly drawing board using the flat surface 26, 26B as a clue to bring the attachment plate 52 into contact with the flat surface 26, 26B, the vehicle body fixing component 50 can be attached at an accurate position.

In this case, depending on the shape of the vehicle body fixing component, it may be necessary to pay attention to an attachment orientation of the vehicle body fixing component. This is because, for example, assuming a case where the vehicle body fixing component is a single-sleeve clamp, depending on whether the vehicle body fixing part 56 is at one end or the other end of an attachment plate 52C that corresponds to the attachment plate 52, the position of the vehicle body fixing part 56 relative to the protective member 20 is different (see FIG. 12).

Figure 12:
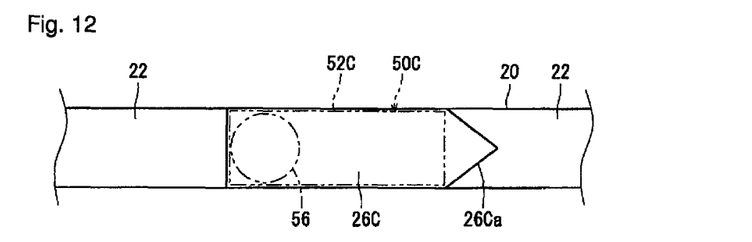
FIG. 12 illustrates a schematic bottom view of a flat surface forming part according to another modified embodiment.

Therefore, as illustrated in FIG. 12, a flat surface 26C may be formed to have a shape that supports an attachment orientation of a vehicle body fixing component 50C. In FIG. 12, one end portion of the flat surface 26C is formed as a triangular portion 26Ca, one end of which gradually narrows outwardly. As a result, an operator can recognize an attachment orientation of the vehicle body fixing component 50 using the triangular portion 26Ca as a clue, and attach the vehicle body fixing component 50. For example, the vehicle body fixing component 50 can be attached to the protective member 20 in a manner that the attachment plate 52 extends toward the triangular portion 26Ca side with respect to the vehicle body fixing part 56.

Figure 13:
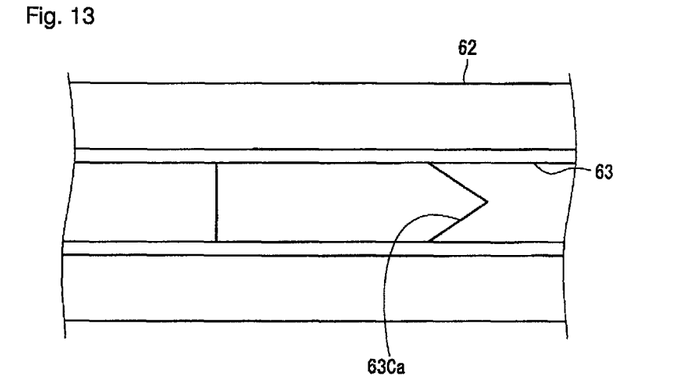
FIG. 13 illustrates an explanatory diagram of a lower mold for forming a flat surface forming part according to another modified embodiment.

As illustrated in FIG. 13, the flat surface 26C as described above can be formed by forming a portion of the lower mold surface 63 that corresponds to the flat surface 26C as a recess 63Ca having a pentagonal column shape that corresponds to the flat surface 26C and hot pressing the nonwoven member in the same manner as described above.

An embodiment for indicating the attachment orientation of the vehicle body fixing component using a planar shape is not limited to the above example. In another example, indicating the attachment orientation of the vehicle body fixing component can also be realized by forming two ends of the vehicle body fixing component in the longitudinal direction in asymmetric shapes and the like.

The configurations described in the above embodiments and modified embodiments can be combined as appropriate as far as they do not contradict each other.

In the above, the present invention is described in detail. However, the above description in all aspects is for exemplary purposes and the present invention is not limited by the description. Numerous modified embodiments that are not exemplified can be envisioned without departing from the scope of the present invention.

Scope of the claims:
1. A wire harness, comprising:
a wire harness body that contains at least one electric wire;
a protective member formed by hot pressing a nonwoven member covering at least a portion of the wire harness body, the protective member including a protective body and a flat surface forming part, the protective body being formed to have a circular cross-sectional shape, the flat surface forming part having a flat surface formed on at least a portion of an outer periphery of the flat surface forming part, wherein
a diameter of the protective member is equal to a width of the flat surface in a direction perpendicular to a longitudinal axis of the wire harness body;
a vehicle body fixing component having a long and thin attachment plate, and the vehicle body fixing component including a vehicle body fixing part, wherein the vehicle body fixing component is attached in a condition in which the attachment plate is brought into surface-contact with the flat surface; and
the vehicle body fixing part being attached to the flat surface, the vehicle body fixing part including an engaging lock part having a free end and configured to be inserted into an attaching hole of a vehicle body, and the vehicle body fixing part including a dish-shaped part positioned vertically between the flat surface and the engaging lock part,
wherein the engaging lock part is centered on the longitudinal axis of the wire harness,
wherein, in a direction extending towards the free end of the engaging lock part, the dish-shaped part is tapered outwardly; and
wherein the width of the flat surface is equal to a width of the attachment plate.

2. The wire harness according claim 1, wherein
a length dimension of the flat surface in a longitudinal direction of the protective member corresponds to a length of the attachment plate.

3. The wire harness according claim 1, wherein
the flat surface is formed in a shape that indicates an attachment orientation of the vehicle body fixing component that is attached to the flat surface forming part.

4. A wire harness, comprising:
a wire harness body that contains at least one electric wire; and
a protective member that is formed by hot pressing a nonwoven member covering at least a portion of the wire harness body, the protective member including a protective body and a flat surface forming part, the protective body being formed to have a circular cross-sectional shape, the flat surface forming part having a flat surface formed on at least a portion of an outer periphery of the flat surface forming part, wherein
the flat surface has two ends in a longitudinal direction formed in a non-symmetrical shape so as to indicate an attachment posture of a vehicle body fixing component to be attached to the flat surface forming part,
the vehicle body fixing component having a long and thin attachment plate and including a vehicle body fixing part, wherein the vehicle body fixing component is attached in a condition in which the attachment plate is brought into surface-contact with the flat surface, and wherein
a width of the flat surface, in a direction perpendicular to a longitudinal axis of the wire harness body, is equal to a width of the attachment plate.

5. The wire harness according claim 4, wherein
a length dimension of the flat surface in a longitudinal direction of the protective member corresponds to a length of the attachment plate.

* * * * *